US011491884B2

(12) United States Patent
Stucki et al.

(10) Patent No.: US 11,491,884 B2
(45) Date of Patent: Nov. 8, 2022

(54) MAGNETIC CHARGER CONNECTOR FOR WHEELCHAIR

(71) Applicant: Curtis Instruments, Inc., Mount Kisco, NY (US)

(72) Inventors: Thomas Stucki, Utzenstorf (CH); Thomas Kurzen, Kriegstetten (CH); Christof Zurbrugg, Biberist (CH); Kurt Stump, Bätterkinden (CH)

(73) Assignee: Curtis Instruments Inc., Mt. Kisco, NY (US)

( * ) Notice: Subject to any disclaimer, the term of this patent is extended or adjusted under 35 U.S.C. 154(b) by 82 days.

(21) Appl. No.: 16/559,782

(22) Filed: Sep. 4, 2019

(65) Prior Publication Data
US 2019/0389320 A1 Dec. 26, 2019

Related U.S. Application Data

(63) Continuation-in-part of application No. 15/409,737, filed on Jan. 19, 2017, now Pat. No. 10,386,936.

(51) Int. Cl.
*H01R 13/62* (2006.01)
*B60L 53/16* (2019.01)

(52) U.S. Cl.
CPC .......... *B60L 53/16* (2019.02); *H01R 13/6205* (2013.01); *B60L 2200/34* (2013.01); *H01M 2220/20* (2013.01)

(58) Field of Classification Search
CPC ... H01R 13/6205; H01R 13/703; H01R 11/30
USPC .......................................................... 439/39
See application file for complete search history.

(56) References Cited

U.S. PATENT DOCUMENTS 4,837,547 A * 6/1989 Nixon .................... H01H 37/76
337/398
4,964,805 A * 10/1990 Gabany .................. H01R 24/50
439/434

(Continued)

FOREIGN PATENT DOCUMENTS

CN 102769228 A 11/2012
CN 203277704 U 11/2013

(Continued)

OTHER PUBLICATIONS

"XKeys Joystick Controller. Pdf" published Mar. 18, 2015, downloadable from website https://web.archive.org/web/20150318052848/http://www.ergocanada.com:80/detailed_specification_pages/pi_engineering_xkeys_joystick_controller_46_key.html.

*Primary Examiner* — Alexander Gilman
(74) *Attorney, Agent, or Firm* — Harrington & Smith

(57) ABSTRACT

An apparatus including a first electrical connector; and a second electrical connector. The first and second electrical connectors have magnets to provide a magnetic holding force with each other and provide alignment of the electrical connectors to hold the second electrical connector against the first electrical connector at a predetermined position. Magnetic poles of the magnets are configured to limit orientation of the second electrical connector on the first electrical connector. The second electrical connector includes two power contacts and an interruption detector contact, where the power contacts are movably mounted on the second housing and configured to disconnect from electrical contacts of the first electrical connector, when the second electrical connector is being disconnected from the first electrical connector, only after the interruption detector (Continued)

contact of the second plurality of electrical contacts disconnects from an electrical contact of the first electrical connector.

20 Claims, 11 Drawing Sheets

(56) References Cited

U.S. PATENT DOCUMENTS

| | | | |
|---|---|---|---|
| 5,349,282 A * | 9/1994 | McClure | H02J 7/007184 320/136 |
| 5,476,386 A | 12/1995 | Booth | |
| 5,703,324 A * | 12/1997 | Harder | H01R 24/28 174/21 C |
| 5,725,393 A * | 3/1998 | Steininger | H01R 13/5025 439/597 |
| 5,829,987 A | 11/1998 | Fritsch et al. | |
| 5,909,100 A | 6/1999 | Watanabe et al. | |
| 5,921,783 A | 7/1999 | Fritsch et al. | |
| 6,231,349 B1 | 5/2001 | Bullinger et al. | |
| 6,273,736 B1 * | 8/2001 | Taylor | H01R 13/44 439/149 |
| 6,623,276 B2 * | 9/2003 | Dalmau Ferrerfabrega | H01R 13/6205 335/205 |
| 6,821,126 B2 | 11/2004 | Neidlein | |
| 7,311,526 B2 | 12/2007 | Rohrbach et al. | |
| 7,329,128 B1 * | 2/2008 | Awad | H01R 13/6205 439/38 |
| 7,331,793 B2 | 2/2008 | Hernandez et al. | |
| 7,344,380 B2 | 3/2008 | Neidlein et al. | |
| 7,351,066 B2 | 4/2008 | DiFonzo et al. | |
| 7,901,216 B2 * | 3/2011 | Rohrbach | H01R 13/6205 439/39 |
| 7,931,472 B2 | 4/2011 | David et al. | |
| 8,241,043 B1 * | 8/2012 | Lin | H01R 13/64 439/39 |
| 8,314,669 B2 | 11/2012 | Botsch | |
| 8,388,354 B1 | 3/2013 | Lin et al. | |
| 8,398,409 B2 * | 3/2013 | Schmidt | H01R 11/30 439/39 |
| 8,465,296 B1 * | 6/2013 | Lin | H01R 13/62 439/39 |
| 8,497,753 B2 * | 7/2013 | DiFonzo | H01R 13/641 335/205 |
| 8,506,314 B2 | 8/2013 | Gramsamer et al. | |
| 8,529,274 B2 | 9/2013 | Li et al. | |
| 8,596,881 B2 | 12/2013 | Umeno | |
| 8,696,366 B2 * | 4/2014 | Chen | H01R 11/30 439/39 |
| 8,734,189 B2 * | 5/2014 | Kim | H01R 13/2421 439/700 |
| 8,894,419 B1 * | 11/2014 | Buelow | H01R 13/6205 439/39 |
| 8,970,189 B2 * | 3/2015 | Nakashima | H02M 3/158 323/280 |
| 9,004,924 B2 * | 4/2015 | Kuo | H01R 13/7031 439/39 |
| 9,004,930 B2 | 4/2015 | Gualino et al. | |
| 9,077,105 B2 | 7/2015 | Kim | |
| 9,083,110 B2 | 7/2015 | McClelland | |
| 9,112,303 B2 * | 8/2015 | Zeliff | H01R 11/30 |
| 9,130,328 B1 | 9/2015 | Huang et al. | |
| 9,142,912 B1 * | 9/2015 | Allen | H01R 11/30 |
| 9,152,198 B2 * | 10/2015 | Shi | G06F 1/263 |
| 9,190,782 B2 | 11/2015 | King et al. | |
| 9,252,531 B2 * | 2/2016 | Guo | H01R 13/506 |
| 9,306,323 B2 | 4/2016 | Kim | |
| 9,419,376 B1 | 8/2016 | Blum et al. | |
| 9,419,377 B2 | 8/2016 | Zhu et al. | |
| 9,431,182 B2 | 8/2016 | Kim et al. | |
| 9,509,165 B2 * | 11/2016 | Kim | H02J 7/008 |
| 9,570,842 B2 * | 2/2017 | Nordgren | H01R 13/6205 |
| 9,640,921 B2 * | 5/2017 | Choi | H01R 13/70 |
| 9,660,377 B2 * | 5/2017 | Greig | H01R 13/6205 |
| 9,703,271 B2 | 7/2017 | Kim | |
| 9,711,878 B2 | 7/2017 | Zhang | |
| 9,774,137 B2 | 9/2017 | Park et al. | |
| 9,806,458 B1 * | 10/2017 | Chiu et al. | H01R 13/6205 |
| 9,865,954 B2 * | 1/2018 | Zebhauser | H01R 13/2421 |
| 9,893,540 B2 * | 2/2018 | Zhang | H02J 7/0029 |
| 9,923,358 B2 * | 3/2018 | Tao | H02H 3/16 |
| 10,122,116 B2 * | 11/2018 | Troufflard | H01R 13/6205 |
| 10,333,260 B2 * | 6/2019 | Card | G06F 1/263 |
| 10,386,936 B2 * | 8/2019 | Stucki et al. | A61G 5/1059 |
| 10,523,002 B2 * | 12/2019 | Huang | H01L 27/066 |
| 10,547,196 B2 * | 1/2020 | Jung | H02J 7/045 |
| 2004/0090209 A1 * | 5/2004 | Nishida | H02J 7/007182 320/149 |
| 2004/0209489 A1 | 10/2004 | Clapper | |
| 2006/0110203 A1 | 5/2006 | Grafton | |
| 2006/0294472 A1 | 12/2006 | Cheng | |
| 2007/0056780 A1 * | 3/2007 | Jaenke | A61G 5/04 180/65.1 |
| 2007/0072443 A1 * | 3/2007 | Rohrbach | G06F 1/18 439/39 |
| 2007/0254510 A1 * | 11/2007 | DeBey | H01R 13/6205 439/188 |
| 2007/0259536 A1 * | 11/2007 | Long | H01R 31/06 439/39 |
| 2008/0220324 A1 * | 9/2008 | Phillips | B25F 5/02 429/120 |
| 2008/0315846 A1 * | 12/2008 | Sato | H01M 10/44 320/164 |
| 2010/0331081 A1 * | 12/2010 | Holenweg | A61G 5/10 463/30 |
| 2011/0248670 A1 * | 10/2011 | Yamazaki | H02J 7/0071 320/107 |
| 2012/0143062 A1 | 6/2012 | Nordgren et al. | |
| 2012/0146576 A1 * | 6/2012 | Partovi | H02J 50/90 320/108 |
| 2012/0295451 A1 | 11/2012 | Hyun-Jun et al. | |
| 2013/0175103 A1 * | 7/2013 | Flowers | H01R 13/629 180/65.1 |
| 2013/0286694 A1 * | 10/2013 | Shi | G06F 1/263 363/49 |
| 2013/0335010 A1 * | 12/2013 | Wu | H02J 7/0042 320/107 |
| 2014/0032952 A1 * | 1/2014 | Kim | G06F 1/263 713/323 |
| 2014/0055084 A1 * | 2/2014 | Ishikawa | H02J 7/00304 320/107 |
| 2014/0083225 A1 * | 3/2014 | Downs | B60K 35/00 74/471 XY |
| 2015/0194764 A1 | 7/2015 | Magana et al. | |
| 2015/0263638 A1 * | 9/2015 | Yang | H02M 7/04 363/125 |
| 2015/0364863 A1 | 12/2015 | Andrus et al. | |
| 2016/0013582 A1 | 1/2016 | Byrne et al. | |
| 2016/0062046 A1 | 3/2016 | Lee et al. | |
| 2016/0111871 A1 * | 4/2016 | Ruess | H01C 7/12 361/118 |
| 2016/0126665 A1 * | 5/2016 | Yang | H01R 13/2421 439/39 |
| 2016/0218461 A1 | 7/2016 | Petie | |
| 2016/0241016 A1 * | 8/2016 | Rana | H02H 3/006 |
| 2016/0254616 A1 | 9/2016 | Kim et al. | |
| 2016/0308452 A1 * | 10/2016 | Motoki | H02M 3/33576 |
| 2016/0336761 A1 * | 11/2016 | Hsu | H02J 7/00309 |
| 2016/0349814 A1 * | 12/2016 | Carpenter, Jr. | G06F 13/385 |
| 2018/0191097 A1 * | 7/2018 | Yonnet | H01R 13/44 |
| 2019/0389320 A1 * | 12/2019 | Stucki | B60L 53/16 |

FOREIGN PATENT DOCUMENTS

| | | |
|---|---|---|
| CN | 203277735 U | 11/2013 |
| CN | 203277810 U | 11/2013 |
| CN | 203277811 U | 11/2013 |
| CN | 203690543 U | 7/2014 |
| CN | 203983568 U | 12/2014 |

(56) References Cited

FOREIGN PATENT DOCUMENTS

| | | | |
|---|---|---|---|
| CN | 104966945 | A | 10/2015 |
| DE | 10333403 | A1 | 9/2004 |
| DE | 202007012249 | U1 | 10/2007 |
| DE | 202012007785 | U1 | 9/2012 |
| DE | 202013101011 | U1 | 3/2013 |
| EP | 1220369 | A1 | 7/2002 |
| EP | 1152496 | B1 | 9/2005 |
| EP | 2533374 | A1 | 12/2012 |
| EP | 2595252 | A1 | 5/2013 |
| EP | 2667459 | B1 | 8/2016 |
| FR | 2938383 | A1 | 5/2010 |
| FR | 3012263 | B1 | 12/2015 |
| JP | 2002056929 | A | 2/2002 |
| KR | 960006938 | Y1 | 8/1996 |
| KR | 20040074905 | A | 8/2004 |
| WO | WO-2017001755 | A1 | 1/2017 |
| WO | WO-2017020823 | A1 | 2/2017 |

* cited by examiner

MAGNETIC CHARGER CONNECTOR FOR WHEELCHAIR

CROSS REFERENCE TO RELATED APPLICATION

This application is a continuation-in-part application of U.S. application Ser. No. 15/409,737 filed Jan. 19, 2017 which is hereby incorporated by reference in its entirety.

BACKGROUND

Field of the Invention

The example and non-limiting embodiments relate generally to a personal mobility vehicle and, more particularly, to an electrical charging system for a personal mobility vehicle, such as a wheelchair for example.

Brief Description of Prior Developments

Self-powered personal mobility vehicles, such as wheelchairs having a self-contained power source to provide drive power to wheels and steering actuators, may include various systems to control the various power and motive subsystems of the vehicle, as well as to implement a user interface function enabling an occupant of the vehicle to control the overall operation of the vehicle, such as to start, stop and steer the vehicle.

SUMMARY

In accordance with one aspect an apparatus is provided comprising: a first electrical connector comprising a first housing, a first plurality of electrical contacts, and a first plurality of magnets; and a second electrical connector comprising a second housing, a second plurality of electrical contacts, and a second plurality of magnets, where the second plurality of electrical contacts comprise two power contacts and an interruption detector contact, where the power contacts are movably mounted on the second housing, where the first plurality of magnets is arranged on the first housing and the second plurality of magnets is arranged on the second housing to allow the second electrical connector to be mounted on the first electrical connector with the first plurality of magnets and the second plurality of magnets providing a magnetic holding force with each other and providing alignment of the second electrical connector with the first electrical connector to hold the second electrical connector against the first electrical connector at a predetermined position, where the first electrical connector has a first one of the first plurality of magnets with magnetic poles orientated opposite from magnetic poles of a second one of the first plurality of magnets, and where the two power contacts of the second electrical connector are configured to disconnect from the first plurality of electrical contacts, when the second electrical connector is being disconnected from the first electrical connector, only after the interruption detector contact of the second plurality of electrical contacts disconnects from the first plurality of electrical contacts.

In accordance with another aspect a personal mobility vehicle is provided comprising: a frame; wheels connected to the frame; a motor on the frame and connected to the wheels; a battery configured to supply electricity to the motor; a user control on the frame, where the user control is configured to be used by a hand of a user while the user is on the personal mobility vehicle, and where the user control is configured to control movement of the wheels based upon electricity from the battery; and a charger port on a side of the user control, where the charger port comprises: a first housing; a first plurality of electrical contacts; and a first plurality of magnets, where a first one of the first plurality of magnets comprises magnetic poles orientated opposite from magnetic poles of a second one of the first plurality of magnets, and where the first plurality of magnets are configured to allow a charger connector to be mounted on the charger port with the first plurality of magnets and a second plurality of magnets on the charger connector providing a magnetic holding force with each other and providing alignment of the charger connector with the charger port to hold the charger connector against the first electrical connector at a predetermined position.

In accordance with another aspect a charger connector is provided comprising: a housing; a plurality of electrical contacts on the housing; and a plurality of magnets on the housing, where the plurality of electrical contacts comprise two power contacts and an interruption detector contact, where the power contacts are movably mounted on the second housing, where the two power contacts are configured to disconnect from power electrical contacts of a charger port, when the charger connector is being disconnected from the charger port, only after the interruption detector contact disconnects from an electrical contact of the charger port, where the plurality of magnets comprise a first one of the plurality of magnets having magnetic poles orientated opposite from magnetic poles of a second one of the plurality of magnets, and where the plurality of magnets are configured to allow the charger connector to be mounted on the charger port with the plurality of magnets and a plurality of magnets on the charger port providing a magnetic holding force with each other and providing alignment of the charger connector with the charger port to hold the charger connector against the first electrical connector at a predetermined position.

BRIEF DESCRIPTION OF THE DRAWINGS

The foregoing aspects and other features of the invention are explained in the following description, taken in connection with the accompanying drawings, wherein.

DETAILED DESCRIPTION

Figure 1:
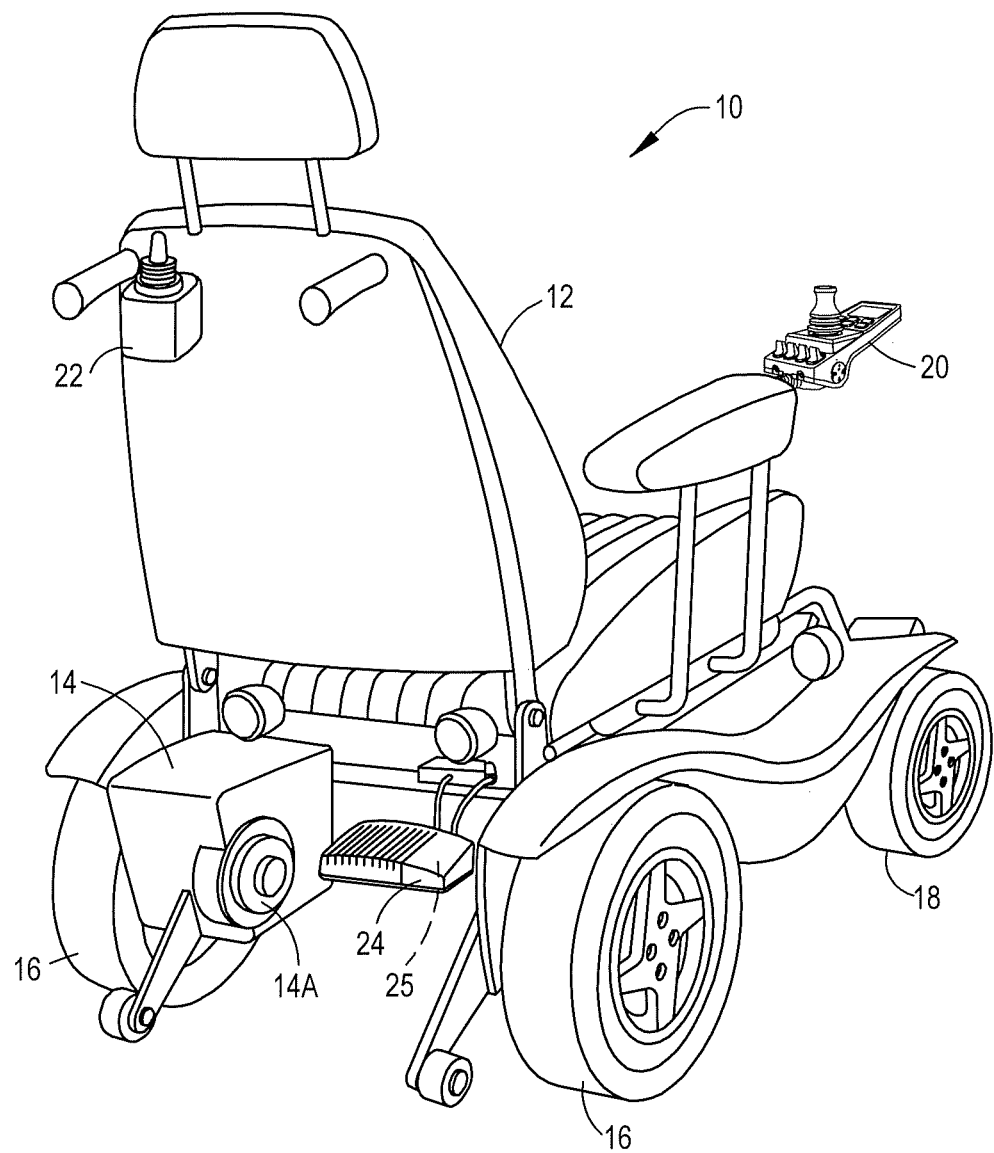
FIG. 1 is a perspective view of a personal mobility vehicle incorporating features of an example embodiment.

Referring to FIG. 1, there is shown a perspective view of a personal mobility vehicle 10 incorporating features of an example embodiment. Although the invention will be described with reference to the exemplary embodiments shown in the drawings, it should be understood that the invention can be embodied in many alternate forms of embodiments. In addition, any suitable size, shape or type of elements or materials could be used.

In the embodiment shown in FIG. 1 the personal mobility vehicle is embodied as a wheelchair system 10, although this is not a limitation upon the use and practice of the exemplary embodiments of this invention. As employed herein a wheelchair system is considered as a vehicle that may be capable of controlled, self-powered (e.g., battery powered) movement for a sitting person.

The wheelchair system 10 includes a seat portion 12, a power source 14, such as a battery and related power conversion, conditioning and recharging circuitry, and at least two wheels 16 that are driven by the power source 14 via at least one motor 14A. One or more other wheels 18 provide stability and enable steering of the wheelchair system 10. In this regard there is a user-actuated hand control system (or user interface) 20. An attendant control system 22 may also be provided. The control system 20 operates with a control system of controller (or control unit) 24 to provide functions that include, but need not be limited to, starting and stopping motive power to the drive wheels 16, controlling the direction of rotation and speed of rotation of the drive wheels 16, and controlling a pointing direction of the wheels 18 to provide steering of the wheelchair 10.

Figure 2:
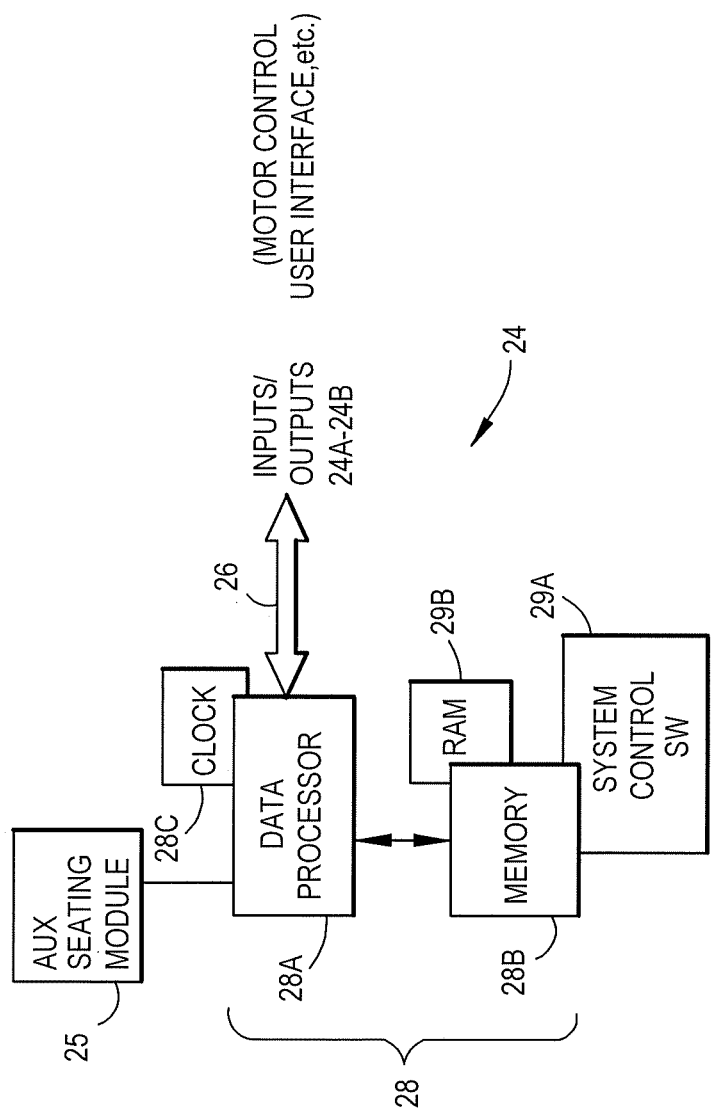
FIG. 2 is a simplified block diagram of a portion of a controller used in the personal mobility vehicle shown in FIG. 1.

FIG. 2 shows a simplified block diagram of a portion of the controller 24. The controller 24 can be assumed to include a software system 28 that includes at least one data processor 28A, such as a microprocessor or microcontroller, and a memory 28B that stores programs to control operation of the data processor 28A and, thereby, to control the overall operation of the wheelchair 10. The operating programs, also referred to as system control software (SW) 29A, may include firmware, such as computer programs that are permanently stored in, by example, non-volatile flash memory, or system control SW 29A may be stored in volatile random access memory (RAM) 29B that is loaded from an SD card or flash type of memory storage medium. The exemplary embodiments of this invention are also usable with a system where a system control SW 29A is stored in a mass memory device, such as SD card(s) and/or flash memory(ies), and loaded into RAM as needed.

The data processor 28A is coupled via general use input/output hardware 26 to various input/outputs, including general input/outputs, such as input/outputs 24A going to and from the user-actuated hand control system 20 and inputs/outputs 24B providing control to the motor(s) 14. A clock function or module 28C can be included for maintaining an accurate time of day and calendar function.

According to some embodiments of the invention, the controller 24 can further be connected to a wireless interface (WI) 30, such as a Bluetooth™ interface, for example. However, any suitable type of wireless interface or connection may be provided.

Figure 3:
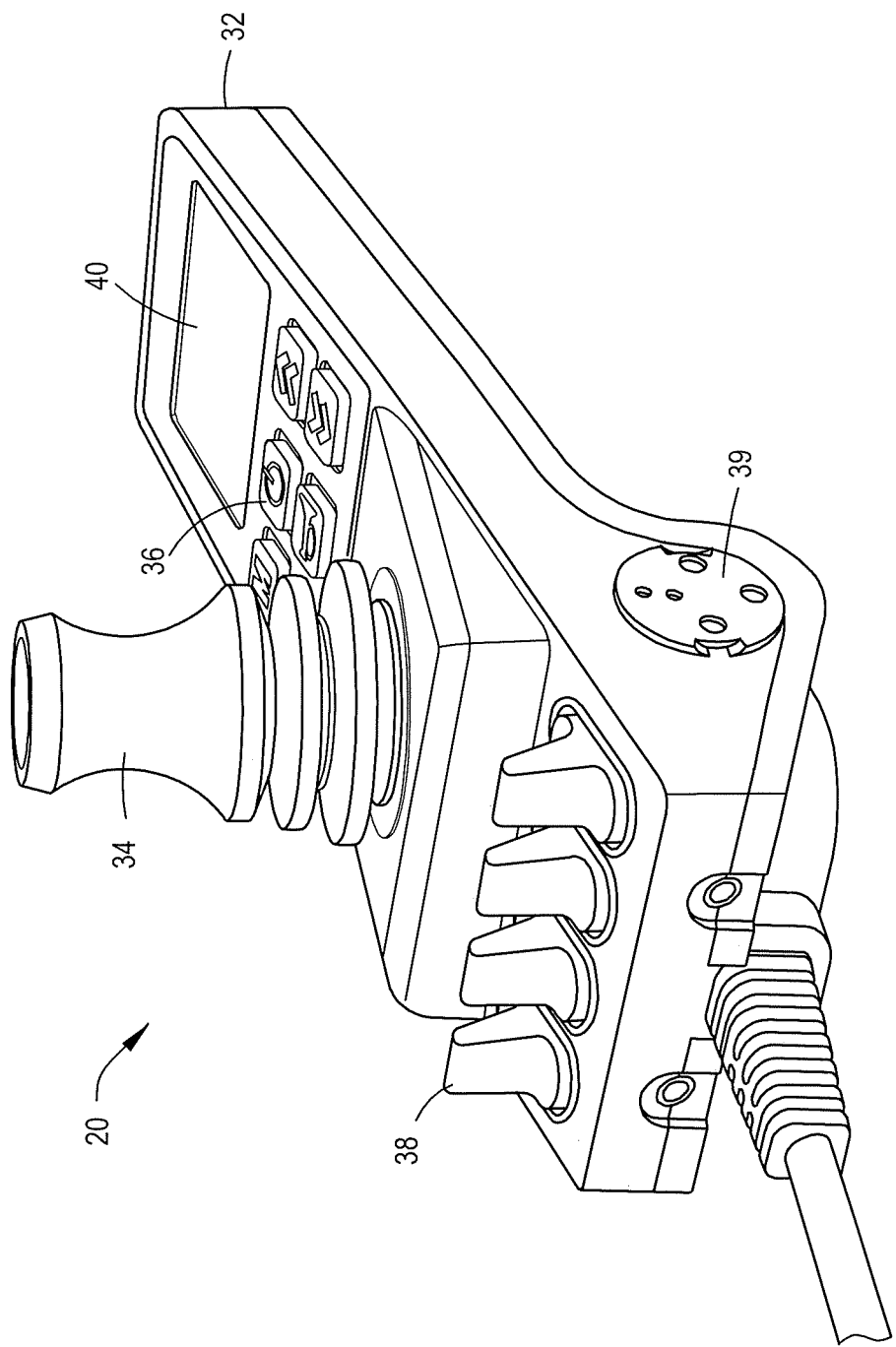
FIG. 3 is a perspective view of a personal mobility vehicle hand control used in the personal mobility vehicle shown in FIG. 1.

Referring now also to FIG. 3, the user-actuated hand control system (or user interface) 20 includes a housing 32, a joystick type controller 34, a first keypad 36, a second keypad 38, a charger port 39, and a display 40, such as an LCD, LED or other suitable type of display system. The first keypad 36 is located in front of the joystick 34 (and between the joystick 34 and the display 40). The second keypad 38 is located behind (or on the rear side of) the joystick 34. Each of the keys on the keypad 36, 38 may comprise any suitable type of key such as press keys, toggle keys, touch, virtual/soft keys, etc. Additionally, it should be noted that although the figures illustrate the first keypad as having six press keys and the second keypad as having four toggle keys, one skilled in the art will appreciate that the various embodiments of the invention are not necessarily so limited and that any suitable number, type, or combination of keys may be provided. The charger port 39 is configured to have a battery charger connected thereto to allow recharging of the battery 14.

The user-actuated hand control system 20 generally allows the user to control the various functions of the wheelchair. For example, the user-actuated hand control system 20 operates with the control system of the controller 24 or a seat or auxiliary module (or auxiliary seating module) 25 to provide functions that include, but need not be limited to, starting and stopping motive power to the drive wheels 16, controlling the direction of rotation and speed of rotation of the drive wheels 16, controlling a pointing direction of the wheels 18 to provide steering of the wheelchair 10, controlling a seat function, and controlling auxiliary functions. According to various exemplary embodiments of the invention, the user-actuated hand control system 20 may be directly connected to the controller 24 (such as by a cable, for example).

The user-actuated hand control system 20 provides improvements over single keypad conventional configurations by allowing for operation of the personal mobility vehicle 10 with user input from a keypad in front of the joystick, and/or for operation of the personal mobility vehicle 10 with user input from a keypad behind the joystick.

Various exemplary embodiments of the invention provide a solution which allows the handcontrol to be fully adjustable with regard to usability, based on the current need of a user. For example, for a user that is comfortable with the keypad in front of the joystick, the keys on the rear side of the joystick can be freely configured for every possible function the wheelchair offers and suits the user. Typically, these keys would be configured for easy/fast access of functions (e.g. seat functions). For a user who has difficulty operating the keys in front of the joystick, the keys on the rear side of the joystick can be freely configured to access all available functions, to the extent of obviating the need for the front keypad. Additionally, since the keys from the keypad on the rear side are freely configurable, the actual functions they contain will be displayed on an area of the display. Furthermore, for the keys on the rear side, there may be more than one set of functions for the keys. If there is more than one set of functions, the set of functions can be chosen by operating one of the keys as a 'master' (e.g. the leftmost or the rightmost keys). The keys in front of the joystick also are freely configurable as well. This provides for the capability that the functionality of each key on each keypad 36, 38 can be configured.

Figure 4:
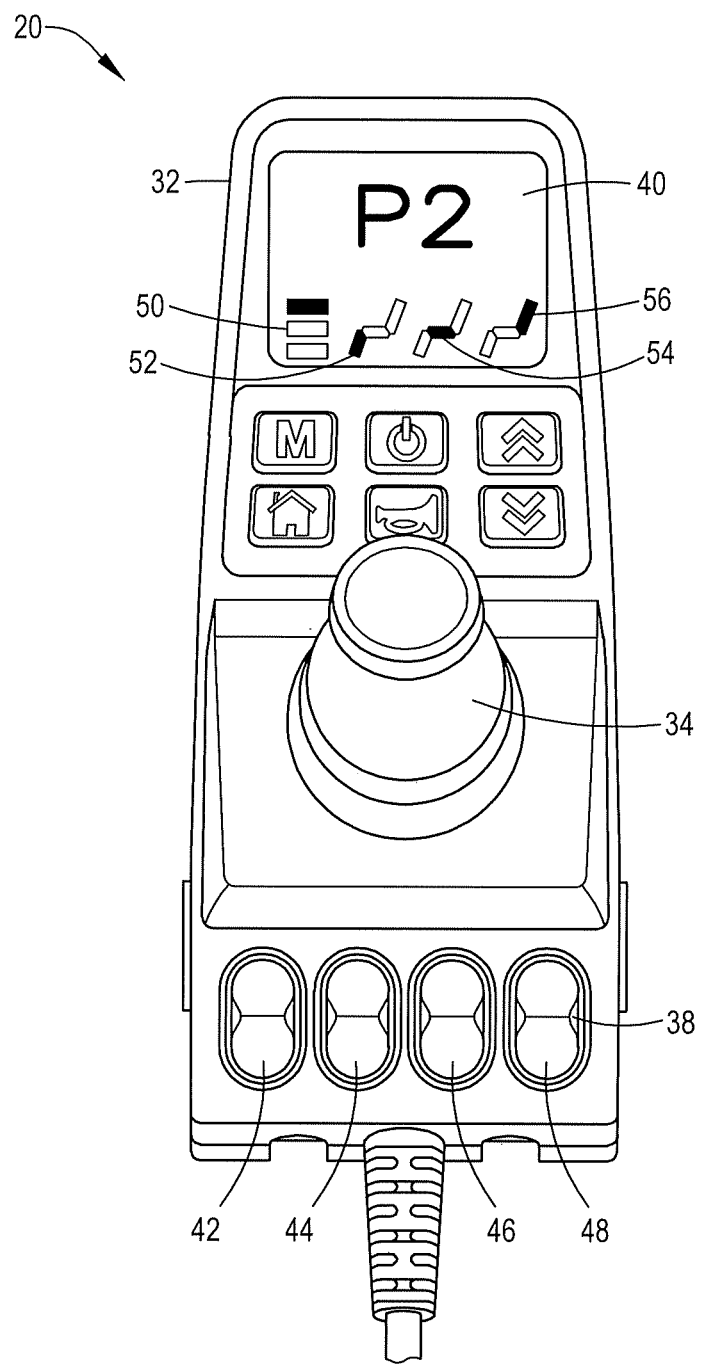
FIG. 4 is a top view of the personal mobility vehicle hand control shown in FIG. 3.

Referring now also to FIG. 4, there is shown an exemplary configuration of the keys of the keypads 36, 38, wherein the current functions of the keys on the second keypad 38 are displayed in an area of the display 40. For example, key 42 of the second keypad 38 corresponds to a first area 50 of the display 40 and shows that there is more than just one set of functions. The active set of functions can be chosen by operating this key 42. Key 44 of the second keypad 38 corresponds to a second area 52 of the display 40 and based on the currently chosen function set, key 44 shows a function for "leg adjustment". Key 46 of the second keypad 38 corresponds to a third area 54 of the display 40 and based on the currently chosen function set, key 46 shows a function for "seat elevate". Key 48 of the second keypad 38 corresponds to a fourth area 56 of the display 40 and based on the currently chosen function set, key 48 shows a function for "backrest adjustment". In some other alternative embodiments, there may be just one set of functions for the keys. In this case, key 42 would have a certain, singular function, however any suitable configuration may be provided.

Technical effects of any one or more of the exemplary embodiments provide a dual configurable keypad configuration providing for the functionality of each key on each keypad 36, 38 to be configurable by the user. This provides for greater usability (based on the current needs of the user) when compared to conventional configurations. Many of the conventional power wheel chair handcontrols are typically comprised of a joystick, a display, and a single keypad (on only a single side of the display).

Some users of personal mobility vehicles prefer having the keypad in front of the joystick. Typically, these keys are used for functions that are enabled while the wheel chair is in drive mode. There are other users who have great difficulty operating keys located in front of the joystick due to the level of their disability. For these users, operating keys on the rear side of the joystick is preferred and advantageous. It is also possible that a user may be initially comfortable using the keys in the front of the joystick but as the disability progresses the keys in the back of the joystick are preferred. Thus technical effects of any one or more of the exemplary embodiments provide users (with varying degrees of disability) of the personal mobility vehicle with wheelchair input devices, such as the handcontrol 20, that are configurable to match their needs.

It should be understood that components of the invention can be operationally coupled or connected and that any number or combination of intervening elements can exist (including no intervening elements). The connections can be direct or indirect and additionally there can merely be a functional relationship between components.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a personal mobility vehicle hand control is disclosed. The personal mobility vehicle hand control comprises: a housing; a display proximate an end of the housing; a first keypad proximate the display; a second keypad proximate an opposite end of the housing; and a joystick between the first keypad and the second keypad; wherein at least one key of the first keypad is configurable to correspond with a function displayed on the display, and wherein at least one key of the second keypad is configurable to correspond with the same function displayed on the display A personal mobility vehicle hand control as above, wherein the function corresponds to a driving feature, a seat function feature, and/or an auxiliary function feature of the personal mobility vehicle.

A personal mobility vehicle hand control as above, wherein the first keypad comprises press keys, toggle keys, touch, and/or virtual/soft keys.

A personal mobility vehicle hand control as above, wherein the second keypad comprises press keys, toggle keys, touch, and/or virtual/soft keys.

A personal mobility vehicle hand control as above, wherein the first keypad is between the display and the joystick.

A personal mobility vehicle hand control as above, wherein the second keypad is configured to be closer to a user than the joystick, and wherein the first keypad is configured to be farther away from the user than the joystick.

A personal mobility vehicle hand control as above, wherein the personal mobility vehicle controller is configured to be connected to a controller having a data processor.

A personal mobility vehicle comprising: a controller having a data processor; and a personal mobility vehicle hand control as above, wherein the personal mobility vehicle hand control is connected to the controller.

In another exemplary embodiment, a personal mobility vehicle is disclosed. The personal mobility vehicle comprises: a control unit having at least one data processor; and a personal mobility vehicle hand control connected to the control unit, wherein the personal mobility vehicle hand control comprises a housing, a display proximate an end of the housing, a first keypad proximate the display, a second keypad proximate an opposite end of the housing, and a joystick between the first keypad and the second keypad, wherein at least one key of the first keypad is configurable to correspond with a function displayed on the display, and wherein at least one key of the second keypad is configurable to correspond with the same function displayed on the display.

A personal mobility vehicle as above, wherein the personal mobility vehicle comprises a wheelchair.

A personal mobility vehicle as above, wherein the function corresponds to a leg adjustment feature, a seat elevation adjustment feature, or a backrest adjustment feature for a seat portion of the personal mobility vehicle.

A personal mobility vehicle as above, wherein the first keypad comprises press keys, toggle keys, touch, and/or virtual/soft keys.

A personal mobility vehicle as above, wherein the second keypad comprises press keys, toggle keys, touch, and/or virtual/soft keys.

A personal mobility vehicle as above, wherein the first keypad is between the display and the joystick.

A personal mobility vehicle as above, wherein the second keypad is configured to be closer to a user of the personal mobility vehicle than the joystick, and wherein the first keypad is configured to be farther away from the user of the personal mobility vehicle than the joystick.

A personal mobility vehicle as above, wherein the hand control is attached to an armrest of the personal mobility vehicle.

In another exemplary embodiment, a method is disclosed. The method comprises: providing a personal mobility vehicle hand control comprising a housing; providing a display proximate an end of the housing; providing a first keypad proximate the display; providing a second keypad proximate an opposite end of the housing; and providing a joystick between the first keypad and the second keypad; wherein at least one key of the first keypad is configurable to correspond with a function displayed on the display, and wherein at least one key of the second keypad is configurable to correspond with the same function displayed on the display.

A method as above, wherein the function corresponds to a driving feature, a seat function feature, and/or an auxiliary function feature of the personal mobility vehicle.

A method as above, wherein the first keypad and the second keypad each comprise press keys, toggle keys, touch, and/or virtual/soft keys.

A method as above, wherein the first keypad is between the display and the joystick.

Figure 5:
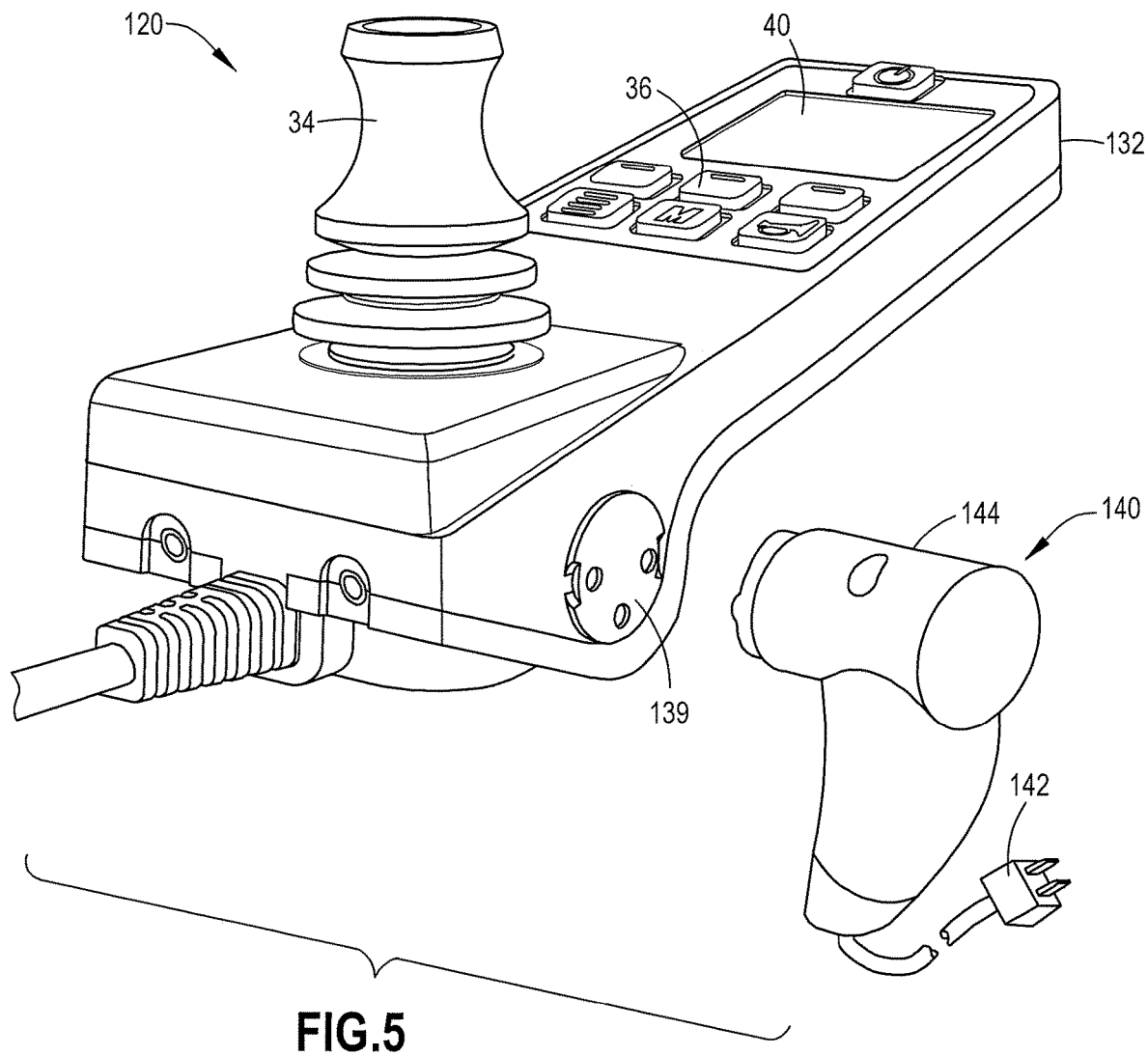
FIG. 5 is a perspective view of a charger connector about to be connected to a charger port on the hand control.

Referring also to FIG. 5, an alternate embodiment of a user interface 120 is shown. Similar to the user interface 20 shown in FIGS. 1 and 3, the user interface 120 generally comprises a housing 132, a joystick type controller 34, a first keypad 36, a display 40, and a charger port 139. FIG. 5 shows one example of the charger port 139 and an example of the charger 140. The charger 140 has a first end with a plug 142 configured to be plugged into an electrical outlet, and a second end with a charger connector 144. The charger connector 144 is configured to be removably connected to the charger port 139 for recharging the battery 14. As seen with reference to FIG. 6, the vehicle may have a controller 146 to control supply of electricity from the charger port 139 to the battery 14. The controller 146 may comprise the processor 28A, the memory 28B and the software stored on the memory 28b. The controller in this example also comprises circuitry in the user input 120 including a printed circuit board in the user input 120.

Users with varying degrees of disability require their wheelchair charger connection to be well accessible and easy to handle. In this example embodiment the charger port is mounted into a sidewall of the input device 120 (hand-control) and is a magnetic charger port configured to hold the charger connector magnetically thereagainst. In an alternate example, the magnetic charger port may be located at any suitable location on the wheelchair such as placed on any side of the wheelchair and is not limited to location on the side of the user input 120. With the provision of a magnetic charger port and a magnetic charger connector, the magnetic charger connector may be magnetically aligned, attracted and held in position with the magnetic charger port. As further described below, spring actuated contacts may be provided as a reliable electrical connection. Also as further described below, the example mechanical design helps to insure that an interruption detector (e.g. the inhibit contact) releases always first, while unplugging the charger connector. This signal may control an electronic protection circuit, which is used to interrupt the charging current in order to avoid electrical arcing upon disconnection of the charging connector from the charging port. Additionally, the protection circuit may prevent leakage currents between the contact pins when the connector is not mated. An over-temperature switch-off may also be provided to prevent damage in case of foreseeable contamination or handling issues.

Figure 6:
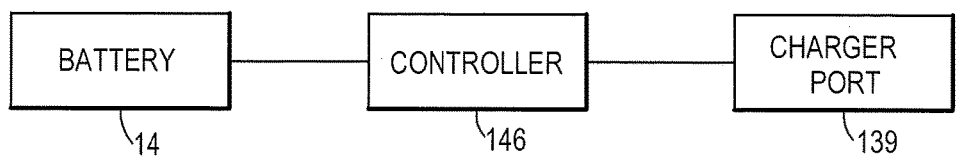
FIG. 6 is a diagram illustrating components of the personal mobility vehicle.
Figure 7:
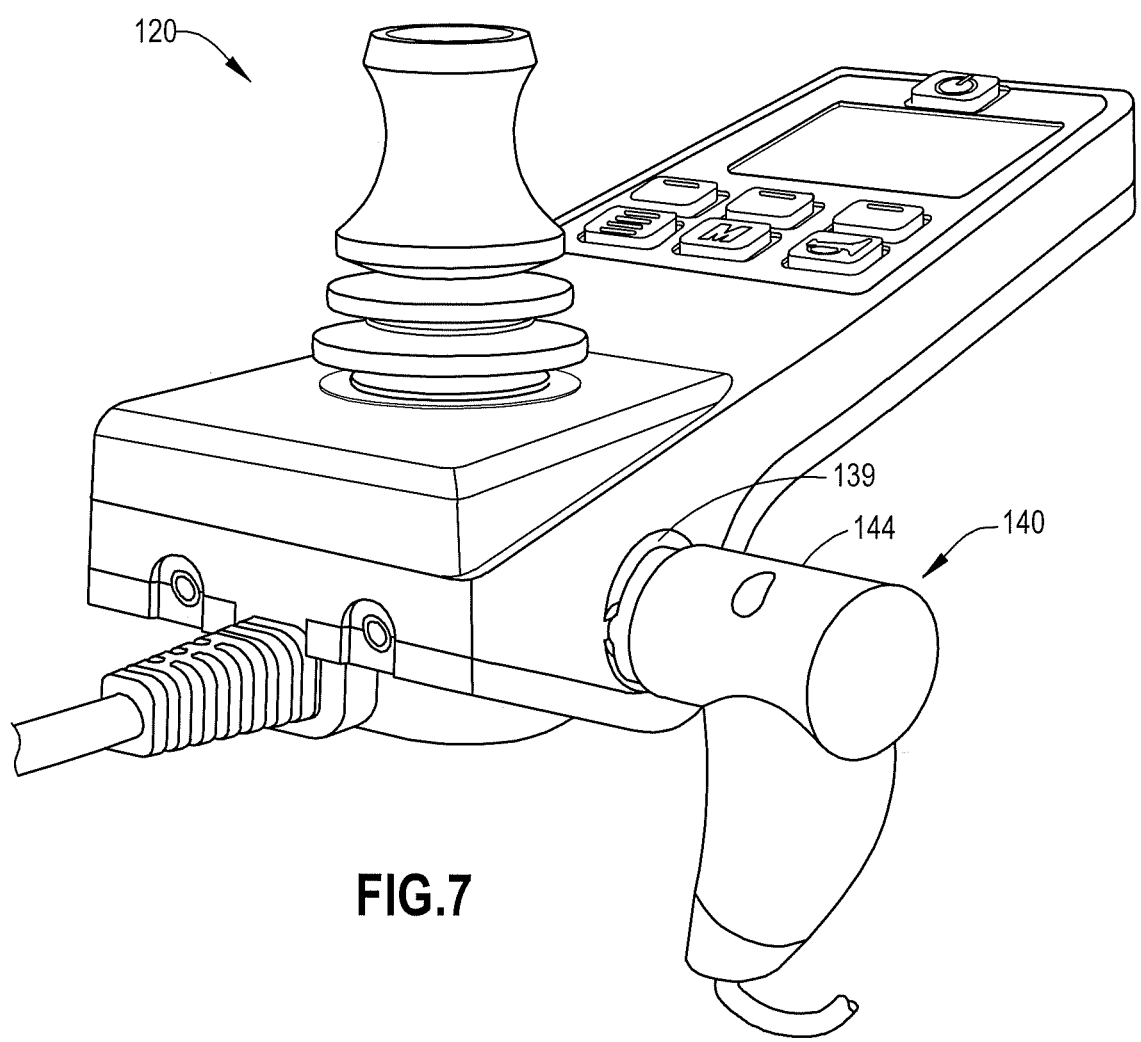
FIG. 7 is a perspective view similar to FIG. 5 showing the charger connector after being connected to a charger port on the hand control.

As seen in comparing FIG. 5 to FIG. 7, in this example embodiment, with the provision of the magnetic charger port (MCP) 139 and the magnetic charger connector (MCC) 144, as the user starts to connect the connector 144 to the port 139, the approach only needs to be approximate because of magnets in the two devices. The connector 144 gets magnetically attracted to the port 139 and, therefore, is positioned automatically to the port at a predetermined position on the port 139. This magnetic attraction, alignment and holding makes connection of the connector 144 to the port much easier to accomplish than a conventional connector, and is particularly well suited for a user having physical disabilities. Disconnection of the connector 144 from the port 139 merely requires overcoming the magnetic attraction of the magnets in the connector 144 to the port 139 without having to overcome frictional retention forces between the connector 144 and the port 139.

Figure 8:
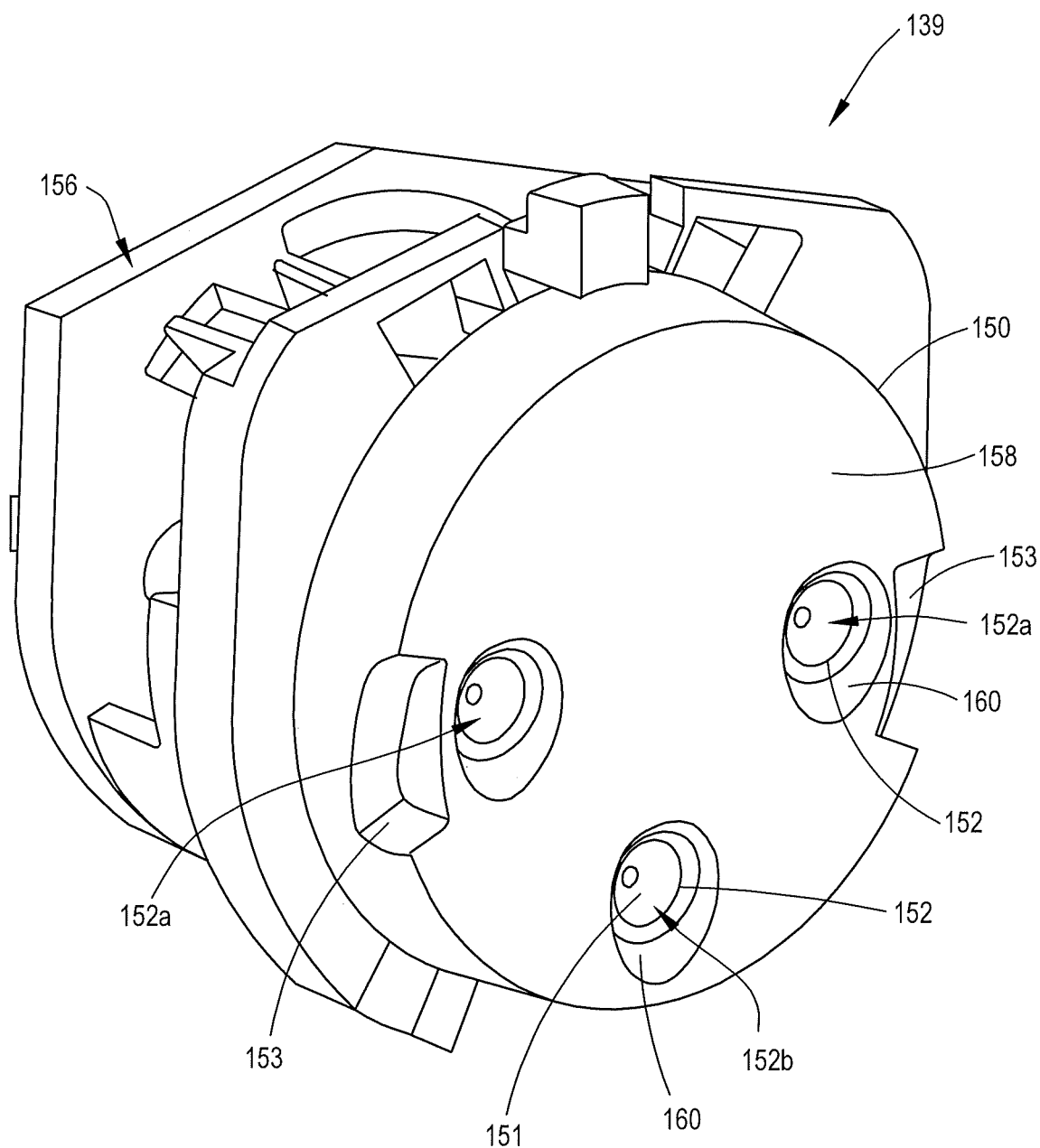
FIG. 8 is a perspective view showing the charger port shown in FIG. 5.
Figure 9:
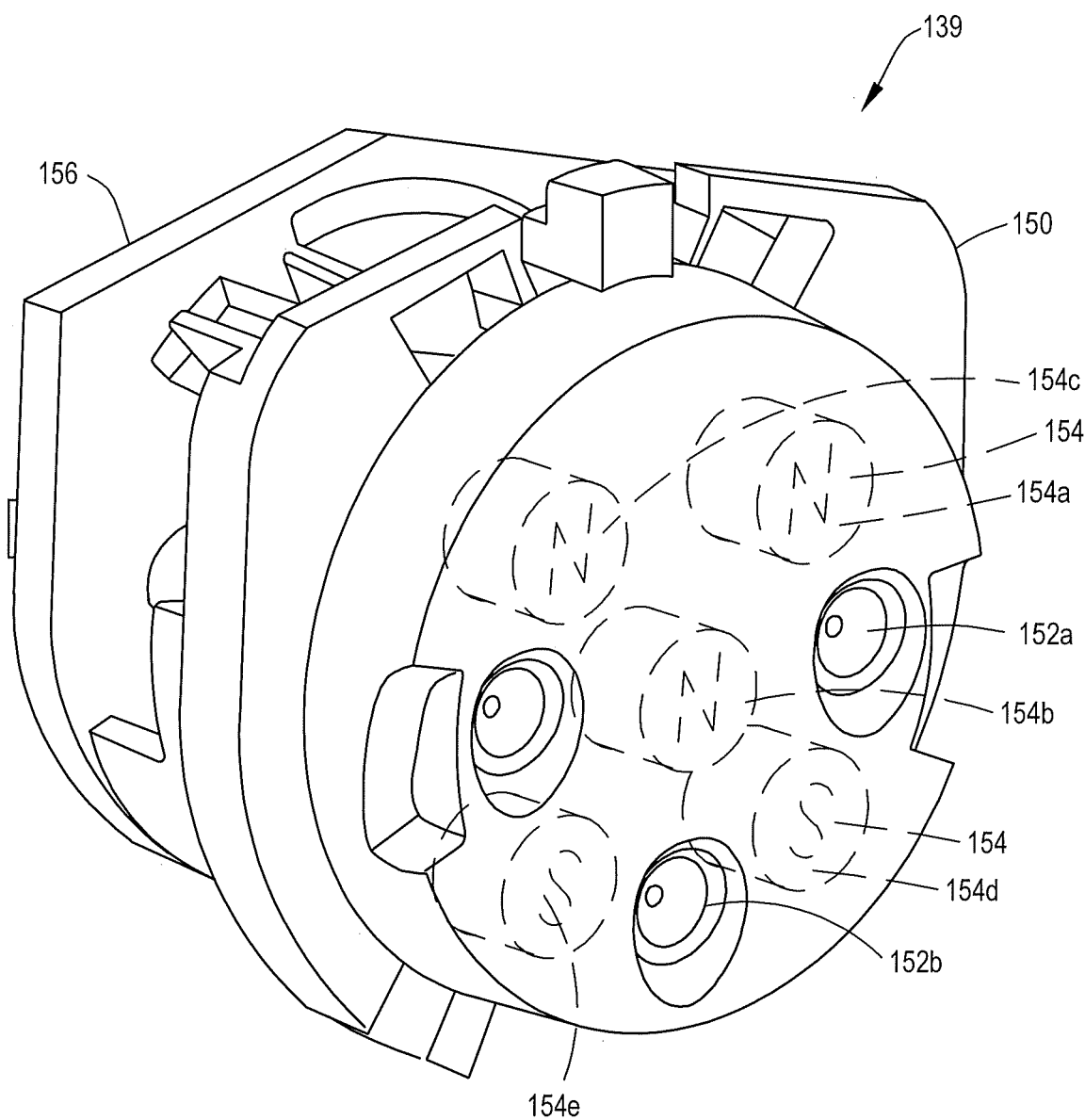
FIG. 9 is a diagram illustrating the internal components of the charger port shown in FIG. 8.
Figure 10:
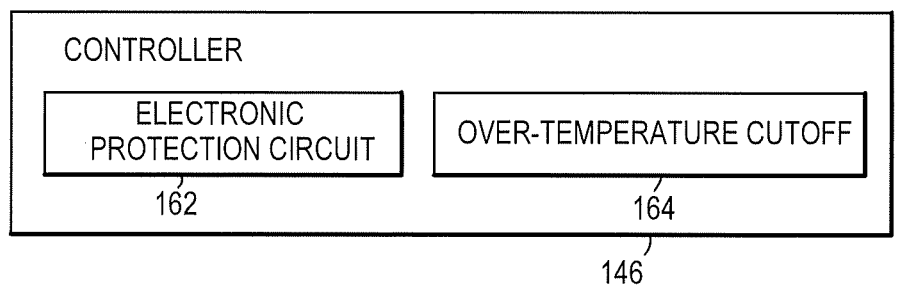
FIG. 10 is a diagram illustrating some of the components of the controller shown in FIG. 6.

Referring also to FIGS. 8-9, the magnetic charger port (MCP) 139 is shown. The charger port 139 generally comprises a housing 150, a first plurality of electrical contacts 152, a first plurality of permanent magnets 154, and a printed circuit board 156. The charger port 139 has three of the electrical contacts 152 in this example; two power contacts 152a (a "+" and a "−") and an interruption detector contact 152b. The contacts 152 have slightly concave front surfaces, and the front of the housing 150 is substantially flat at a connector mating face 158. The connector mating face 158 has three holes with slight tapered entrances 160, and the front surfaces of the contacts 152 are slightly recessed inside the entrances. At least one of the contacts 152 is electrically connected to the printed circuit board 156. As shown with reference to FIG. 10, the controller 146 may comprise an electronic protection circuit 162 and an over-temperature cutoff 164. One or both of these may be provided on the printed circuit board 156.

In this example embodiment, the charger port 139 has five of the permanent magnets 154. However, in alternate embodiments more or less than five permanent magnets could be provided. First ones 154a, 154b, 154c of the magnets 154 have their magnetic poles orientated in a first direction and second ones 154d, 154e of the magnets 154 have their magnetic poles orientated in a second reverse direction. This provides a polarization scheme to limit connection of the connector 144 to the port 139 to only one orientation/position. In this example embodiment, one of the magnets 154b is located between the two power contacts 152a, and the interruption detector contact 152b is located between the second magnets 154d, 154e. This provides a compact spacing design.

Figure 11:
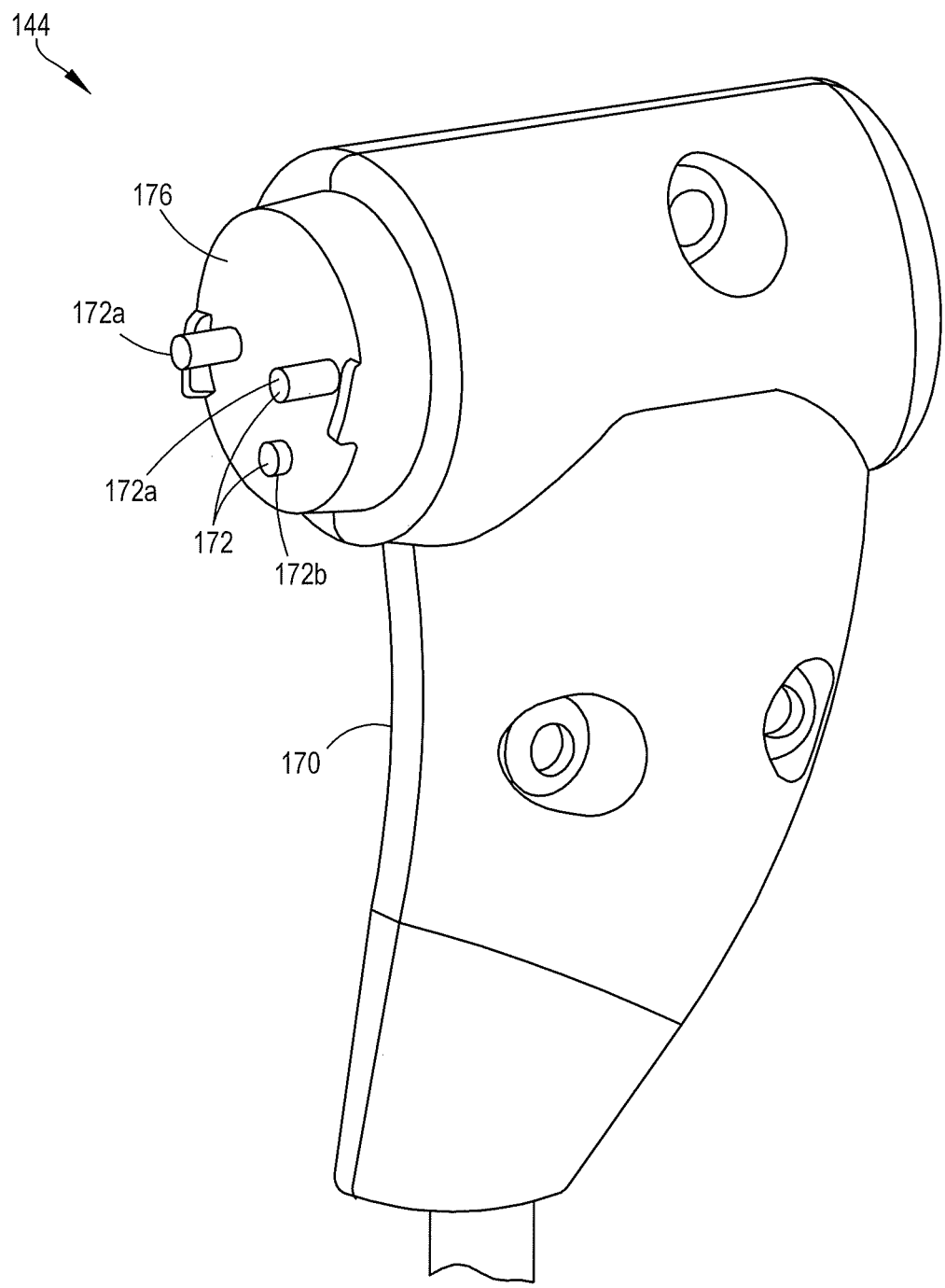
FIG. 11 is a perspective view of the charger connector shown in FIGS. 5 and 7.
Figure 12:
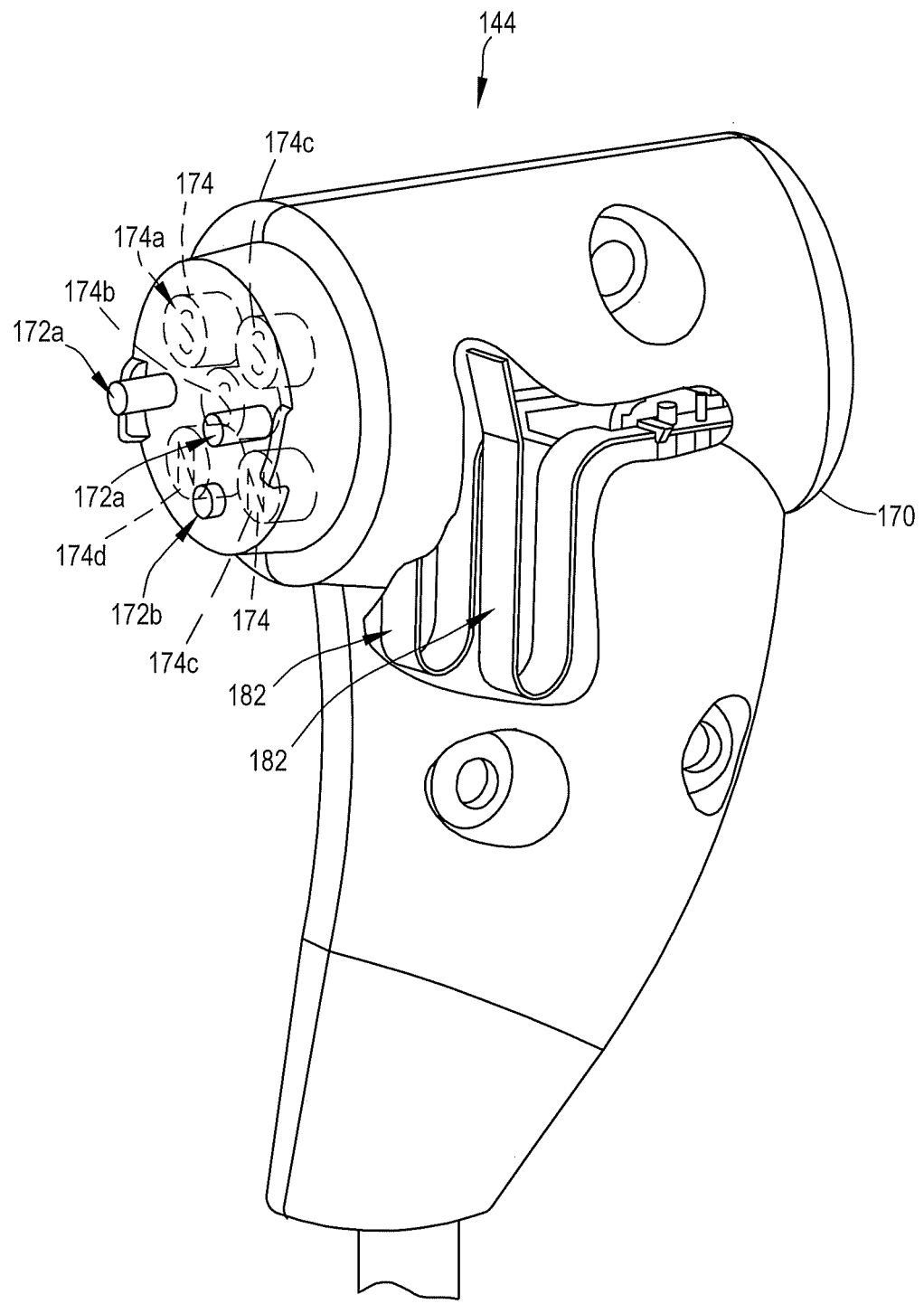
FIG. 12 is a diagram illustrating the internal components of the charger connector shown in FIG. 11.

Referring also to FIGS. 11-12, the example embodiment of the charging connector 144 is shown. The charging connector 144 generally comprises a second housing 170, a second plurality of electrical contacts 172, and a second plurality of magnets 174. The second plurality of electrical contacts 172 comprises two power contacts 172a (a "+" and a "−") and an interruption detector contact 172b. The power contacts 172a are movably mounted on the second housing 170. FIGS. 11-12 show the power contacts 172a in their forward extended positions. However the power contacts 172a are mounted to the housing 170 in order to be pushed rearward in a direction into the housing 170. The interruption detector contact 172b is stationarily attached to the housing 170 in this example. However, in an alternate example the interruption detector contact 172b may also be movably mounted to the housing 170. The front faces 173 of the contacts 172 may be slightly convex to mate with the slightly concave shape of the front faces 151 of the contacts 152. In an alternate example, the front faces 151, 173 could merely be flat or have other shapes.

The housing 170 forms a handle for a user to locate the connector 144 towards the port 139 in order for the magnetic attraction forces in the port 139 and connector 144 to interact and pull the connector 144 against the port 139. The housing 170 has a mating connector flat front face 176 which is configured to abut against the flat face 158 of the port's housing 150. In this example the housing 170 has projections 178 at opposite sides of the face 176 which are configured to project into the side slots 153 of the housing 150. These projections 178 and slots 153 merely help to prevent accidental rotation of the connector 144 on the port 139 after connection. In an alternate example, if the magnetic forces are very strong, these projections 178 and slots 153 may be sized and shaped to be able to function as cams or ramps; to help move the connector 144 away from port 139 during disconnection by rotating the connector 144 about the port 139.

In the example embodiment shown, similar to the charger port 139, the charging connector 144 has five of the permanent magnets 172. However, more or less than five permanent magnets could be provided. First ones 174a, 174b, 174c of the magnets 174 have their magnetic poles orientated in a first direction and second ones 174d, 174e of the magnets 174 have their magnetic poles orientated in a second reverse direction. This provides a polarization scheme to limit connection of the connector 144 to the port 139 to only one orientation/position. In this example embodiment, one of the magnets 174b is located between the two power contacts 172a, and the interruption detector contact 172b is located between the second magnets 174d, 174e. This provides a compact spacing design. The first magnets 174a-c have their polarity are orientated to attract with first magnets 154a-c, and the second magnets 174d-e have their polarity orientated to attract with second magnets 154d-e. This is illustrated by the North pole (N) and South pole (S) markings shown in the drawings.

Figure 13:
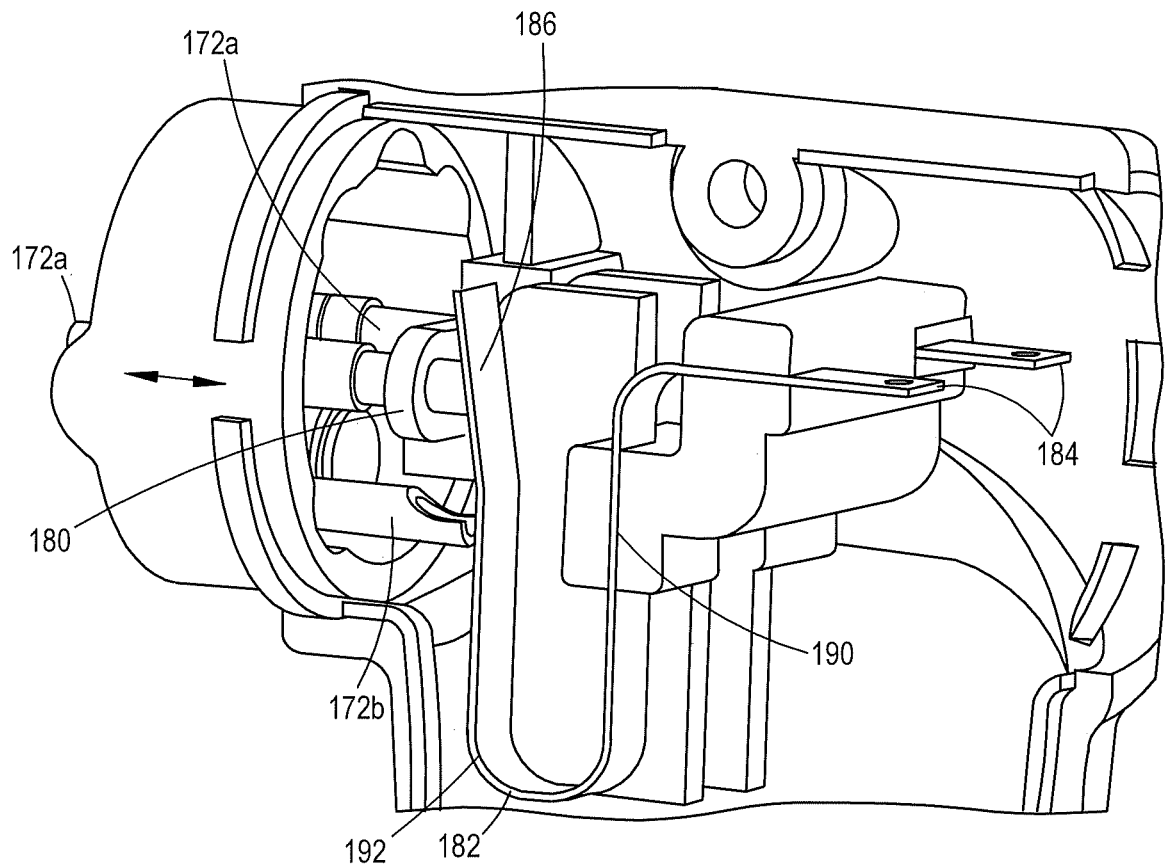
FIG. 13 is a diagram illustrating some of the internal components of the charger connector shown in FIG. 12.
Figure 14:
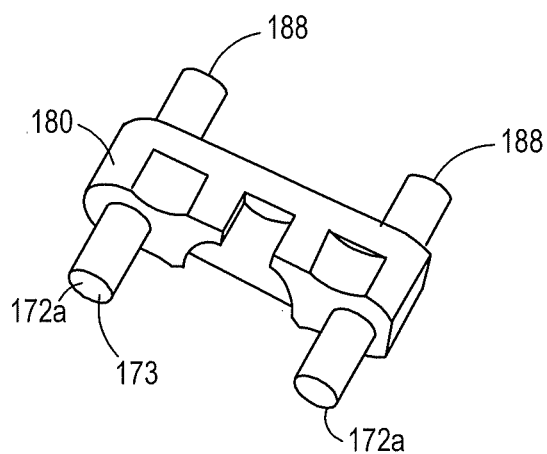
FIG. 14 is a perspective view of one of the components shown in FIG. 13.

Referring also to FIGS. 13-14, in this example embodiment the two power contacts 172a are attached to a frame piece 180. The frame piece 180 is located inside the housing 170 and is movable on the housing 170, as indicated by arrow A, between a forward position and a rearward position. In an alternate example embodiment the frame piece 180 might not be provide; such as where the two power contacts 172a are configured to move separately relative to one another.

The connector 144 comprises two electrical conductors 182 which connect electrical wires (not shown) of the charger 140 to the power contacts 172a. FIG. 13 shows areas 184 for soldering the wires to the electrical conductors 182. Areas 184 are at a first end of the electrical conductors 182 and areas 186 are at a second end of the electrical conductors 182. The areas 186 contact the rear ends 188 of the power contacts 172a. A center portion 190 of each of the electrical conductors 182 is fixedly held in the housing 170. The electrical conductors 182 each have a portion 192 which forms a deflectable spring to allow the areas 186 to bias the power contacts 172a in a forward direction, but which allow the power contacts 172a to move rearward with the portions 192 resiliently deflecting.

FIG. 11 shows the power contacts 172a at their forward biased positions. When the charger connector 144 is positioned against the charger port 139, the power contacts 172a will make contact with the power contacts 152a before the interruption detector contact 172b makes contact with the interruption detector contact 152b. Further movement of the charger connector 144 towards the charger port 139 will cause the power contacts 172a to be pushed inward into the housing 170; with the electrical conductors 182 resiliently deflecting at portions 192. The controller 146 is configured to maintain an open electrical circuit between the power contacts 152a until the interruption detector contact 152b makes contact with the interruption detector contact 172b. Once the controller 146 determines that the interruption detector contact 172b has made contact with the interruption detector contact 152b, the controller 146 will then enable the open circuit to be closed and electricity will then be able to flow through the charger 140 into the charger port 139 to thereby allow the battery 14 to begin recharging.

In order to disconnect the charger connector 144 from the charger port 139, the user merely needs to pull on the charger connector 144 with sufficient force to overcome the magnetic attraction of the magnets 174 to the magnets 154. During the process of the charger connector 144 being disconnected from the charger port 139, the interruption detector contact 172b will disconnect from the interruption detector contact 152b before the power contacts 172a disconnect from the power contacts 152a. This is provided by the biasing feature of the electrical conductors 182 against the power contacts 172a to maintain electrical connection of the power contacts 172a to the power contacts 152a. Once the controller 146 determines that the interruption detector contact 172b has disconnected from the interruption detector contact 152b, the controller will cause an open circuit to be created between the power contacts 152a. This will prevent electrical arcing as the power contacts 172a subsequently disconnect from the power contacts 152a. Further pulling of the charger connector 144 away from the charger port 139 will cause the power contacts 172a to eventually disconnect from the power contacts 152a.

Features as described herein may be used to provide a magnetic charger connector. Users with varying degrees of disability may require their wheelchair charger connection to be well accessible and easy to handle. This may be provided by mounting a magnetic charger port into the sidewalls of the input device (handcontrol). In alternate examples, the magnetic connector may be placed on any side of a Wheelchair device like handcontrol, advanced display or elsewhere. It may alternatively be placed as an independent charger device on any position/location of a wheelchair.

The charger connector may be magnetically aligned, attracted and held in position by the magnetic charger port. Spring actuated contacts may be provided for a reliable electrical connection. The mechanical design may be used to guarantee that an interruption detector (e.g. the inhibit contact) always releases first, before the power contacts, while unplugging the charger connector. This may be used to signal control of the electronic protection circuit, which interrupts the charging current in order to avoid electrical arcing upon disconnection. Additionally, the protection circuit may be used to prevent leakage currents between the contact pins when the connector is not mated. An over-temperature switch-off 164 may be provided to prevent damage in case of foreseeable contamination or handling issues. The magnet charger port (MCP) may be integrated to the side of a wheel chair device. During connection, the user merely has to approach with the magnet charger connector (MCC) to the MCP approximately. Then, the magnets will cause the MCC to be magnetically attracted towards the MCP and, therefore, positioned automatically to the MCC onto the MCP at a predetermined location with the electrical contacts being aligned. This type of mechanical design guarantees that the interruption detector contact always releases first, while unplugging the charger connector. This detection is important to be able to prevent from electrical arcing upon disconnection.

In accordance with one example embodiment, an apparatus may be provided comprising: a first electrical connector comprising a first housing, a first plurality of electrical contacts, and a first plurality of magnets; and a second electrical connector comprising a second housing, a second plurality of electrical contacts, and a second plurality of magnets, where the second plurality of electrical contacts comprise two power contacts and an interruption detector contact, where the power contacts are movably mounted on the second housing, where the first plurality of magnets is arranged on the first housing and the second plurality of magnets is arranged on the second housing to allow the second electrical connector to be mounted on the first electrical connector with the first plurality of magnets and the second plurality of magnets providing a magnetic holding force with each other and providing alignment of the second electrical connector with the first electrical connector to hold the second electrical connector against the first electrical connector at a predetermined position, where the first electrical connector has a first one of the first plurality of magnets with magnetic poles orientated opposite from magnetic poles of a second one of the first plurality of magnets, and where the two power contacts of the second electrical connector are configured to disconnect from the first plurality of electrical contacts, when the second electrical connector is being disconnected from the first electrical connector, only after the interruption detector contact of the second plurality of electrical contacts disconnects from the first plurality of electrical contacts.

The power contacts of the second electrical connector may be spring biased in a forward position on the second housing by electrical conductors in the second housing. The interruption detection contact may be stationarily mounted on the second housing. The power contacts of the second electrical connector may be connected to each other by a frame piece, where the frame piece is movable in the second housing between a forward position and a rearward position. The first plurality of magnets may comprise at least one magnet located between two electrical contacts of the first plurality of electrical contacts. The second plurality of magnets may comprise at least one magnet located between the two power contacts. The interruption detector contact may be located between at least two magnets of the second plurality of magnets. The first plurality of magnets may comprise at least five magnets with at least two of the magnets having their poles orientated opposite to the magnetic poles of other ones of the at least five magnets. The first electrical connector may comprise a printed circuit board connected to at least one of the first plurality of electrical contacts, where the printed circuit board comprises an electronic protection circuit and an over-temperature cutoff. The apparatus may comprise a wheelchair having the first electrical connector thereon. The first electrical connector may be on a side of a user control of the wheelchair, where the user control is configured to be used by a hand of a user while the user is on the wheelchair, and where the user control is configured to control movement of wheels of the wheelchair based upon electricity from a battery of a wheelchair.

In accordance with another example embodiment, a personal mobility vehicle may be provided comprising: a frame; wheels connected to the frame; a motor on the frame and connected to the wheels; a battery configured to supply electricity to the motor; a user control on the frame, where the user control is configured to be used by a hand of a user while the user is on the personal mobility vehicle, and where the user control is configured to control movement of the wheels based upon electricity from the battery; and a charger port on a side of the user control, where the charger port comprises: a first housing; a first plurality of electrical contacts; and a first plurality of magnets, where a first one of the first plurality of magnets comprises magnetic poles orientated opposite from magnetic poles of a second one of the first plurality of magnets, and where the first plurality of magnets are configured to allow a charger connector to be mounted on the charger port with the first plurality of magnets and a second plurality of magnets on the charger connector providing a magnetic holding force with each other and providing alignment of the charger connector with the charger port to hold the charger connector against the first electrical connector at a predetermined position.

The personal mobility vehicle may further comprise a battery charging cord, where the battery charging cord comprises a first end having the charger connector and a second end having a plug configured to be plugged into an electrical outlet. The first plurality of magnets may comprise at least one magnet located between two electrical power contacts of the first plurality of electrical contacts. The charger connector may comprise a second housing, a second plurality of electrical contacts, and a second plurality of magnets, where the second plurality of electrical contacts comprise two power contacts and an interruption detector contact, where the power contacts are movably mounted on the second housing, where the two power contacts of the second electrical connector are configured to disconnect from the first plurality of electrical contacts, when the second electrical connector is being disconnected from the first electrical connector, only after the interruption detector contact of the second plurality of electrical contacts disconnects from the first plurality of electrical contacts. The interruption detection contact may be stationarily mounted on the second housing. The first plurality of magnets may comprise at least five magnets with at least two of the magnets having their poles orientated opposite to the magnetic poles of other ones of the at least five magnets. The charger port may comprise a printed circuit board connected to at least one of the first plurality of electrical contacts, where the printed circuit board comprises an electronic protection circuit and an over-temperature cutoff.

In accordance with another example embodiment, a charger connector may be provided comprising: a housing; a plurality of electrical contacts on the housing; and a plurality of magnets on the housing, where the plurality of electrical contacts comprise two power contacts and an interruption detector contact, where the power contacts are movably mounted on the second housing, where the two power contacts are configured to disconnect from power electrical contacts of a charger port, when the charger connector is being disconnected from the charger port, only after the interruption detector contact disconnects from an electrical contact of the charger port, where the plurality of magnets comprise a first one of the plurality of magnets having magnetic poles orientated opposite from magnetic poles of a second one of the plurality of magnets, and where the plurality of magnets are configured to allow the charger connector to be mounted on the charger port with the plurality of magnets and a plurality of magnets on the charger port providing a magnetic holding force with each other and providing alignment of the charger connector with the charger port to hold the charger connector against the first electrical connector at a predetermined position.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
  a first electrical connector comprising a first housing, a first plurality of electrical contacts, and first magnets, where a first one of the first magnets has magnetic poles orientated opposite relative to magnetic poles of a second one of the first magnets; and
  a second electrical connector comprising a second housing, a second plurality of electrical contacts, and second magnets, where the second plurality of electrical contacts comprise two power contacts and an interruption detector contact, where the power contacts are movably mounted on the second housing,
  where the first magnets are arranged on the first housing and the second magnets are arranged on the second housing to allow the second electrical connector to be mounted on the first electrical connector with the first magnets and the second magnets providing a magnetic holding force directly with each other and providing alignment of the second electrical connector with the first electrical connector to hold the second electrical connector against the first electrical connector at a predetermined position, and
  where the two power contacts of the second electrical connector are configured to disconnect from the first plurality of electrical contacts, when the second electrical connector is being disconnected from the first electrical connector, only after the interruption detector contact of the second plurality of electrical contacts disconnects from the first plurality of electrical contacts.

2. The apparatus as in claim 1 where the power contacts of the second electrical connector are spring biased in a forward position on the second housing by electrical conductors in the second housing.

3. The apparatus as in claim 2 where the interruption detection contact is stationarily mounted on the second housing.

4. The apparatus as in claim 3 where the power contacts of the second electrical connector are connected to each other by a frame piece, where the frame piece is movable in the second housing between a forward position and a rearward position.

5. The apparatus as in claim 1 where the first magnets comprise at least one of the first magnets located between two electrical contacts of the first plurality of electrical contacts.

6. The apparatus as in claim 5 where the second magnets comprise at least one of the second magnets located between the two power contacts.

7. The apparatus as in claim 6 where the interruption detector contact is located between at least two of the second magnets.

8. The apparatus as in claim 1 where the first magnets comprises at least five of the first magnets, where at least two of the five magnets have their magnetic poles orientated opposite to the magnetic poles of other ones of the five magnets.

9. The apparatus as in claim 1 where the first electrical connector comprise a printed circuit board connected to at least one of the first plurality of electrical contacts, where the printed circuit board comprises an electronic protection circuit and an over-temperature cutoff.

10. The apparatus as in claim 1 where the apparatus comprises a wheelchair having the first electrical connector thereon.

11. The apparatus as in claim 10 where the first electrical connector is on a side of a user control of the wheelchair, where the user control is configured to be used by a hand of a user while the user is on the wheelchair, and where the user control is configured to control movement of wheels of the wheelchair based upon electricity from a battery of a wheelchair.

12. A personal mobility vehicle comprising:
  a frame;
  wheels connected to the frame;
  a motor on the frame and connected to the wheels;
  a battery configured to supply electricity to the motor;
  a user control on the frame, where the user control is configured to be used by a hand of a user while the user is on the personal mobility vehicle, and where the user control is configured to control movement of the wheels based upon electricity from the battery; and
  a charger port on a side of the user control, where the charger port comprises:
  a first housing;
  a first plurality of electrical contacts; and
  a first plurality of magnets, where a first one of the first plurality of magnets comprises magnetic poles orientated opposite from magnetic poles of a second one of the first plurality of magnets, and where the first plurality of magnets are configured to allow a charger connector to be mounted on the charger port with the first plurality of magnets and a second plurality of magnets on the charger connector providing a magnetic holding force with directly each other and providing alignment of the charger connector with the charger port to hold the charger connector against the charger port at a predetermined position.

13. The personal mobility vehicle as in claim 12, further comprising a battery charging cord, where the battery charging cord comprises a first end having the charger connector and a second end having a plug configured to be plugged into an electrical outlet.

14. The personal mobility vehicle as in claim 13 where the first plurality of magnets comprise at least one magnet located between two electrical power contacts of the first plurality of electrical contacts.

15. The personal mobility vehicle as in claim 13 further comprising the charger connector, where the charger connector comprises a second housing, a second plurality of electrical contacts, and a second plurality of magnets, where the second plurality of electrical contacts comprise two power contacts and an interruption detector contact, where the power contacts are movably mounted on the second housing, where the two power contacts of the second electrical connector are configured to disconnect from the first plurality of electrical contacts, when the second electrical connector is being disconnected from the first electrical connector, only after the interruption detector contact of the second plurality of electrical contacts disconnects from the first plurality of electrical contacts.

16. The personal mobility vehicle as in claim 15 where the interruption detection contact is stationarily mounted on the second housing.

17. The personal mobility vehicle as in claim 12 where the first plurality of magnets comprises at least five magnets with at least two of the magnets having their poles orientated opposite to the magnetic poles of other ones of the at least five magnets.

18. The personal mobility vehicle as in claim 12 where the charger port comprises a printed circuit board connected to at least one of the first plurality of electrical contacts, where the printed circuit board comprises an electronic protection circuit and an over-temperature cutoff.

19. A charger connector comprising:
a housing;
a plurality of electrical contacts on the housing; and
a plurality of magnets on the housing,
where the plurality of electrical contacts comprise two power contacts and an interruption detector contact, where the power contacts are movably mounted on the housing,
where the two power contacts are configured to disconnect from power electrical contacts of a charger port, when the charger connector is being disconnected from the charger port, only after the interruption detector contact disconnects from an electrical contact of the charger port,
where the plurality of magnets comprise a first one of the plurality of magnets having magnetic poles orientated opposite from magnetic poles of a second one of the plurality of magnets, and where the plurality of magnets are configured to allow the charger connector to be mounted on the charger port with the plurality of magnets and a plurality of magnets on the charger port providing a magnetic holding force directly with each other and providing alignment of the charger connector with the charger port to hold the charger connector against the charger port at a predetermined position.

20. An apparatus comprising:
the charger connector as in claim 19; and
a personal mobility vehicle comprising:
a frame;
wheels connected to the frame;
a motor on the frame and connected to the wheels;
a battery configured to supply electricity to the motor;
a user control on the frame, where the user control is configured to be used by a hand of a user while the user is on the personal mobility vehicle, and where the user control is configured to control movement of the wheels based upon electricity from the battery; and
the charger port on a side of the user control, where the charger connector is configured to be removably connected to the charger port, where the charger port comprises:
a first housing;
a first plurality of electrical contacts; and
a first plurality of first magnets, where a first one of the first plurality of first magnets comprises magnetic poles orientated opposite from magnetic poles of a second one of the first plurality of first magnets, and where the first plurality of first magnets are configured to allow the charger connector to be mounted on the charger port with the first plurality of first magnets and the plurality of magnets on the charger connector providing a magnetic holding force with each other and providing alignment of the charger connector with the charger port to hold the charger connector against the charger port at a predetermined position.

* * * * *